United States Patent
Troy et al.

(10) Patent No.: US 9,533,724 B2
(45) Date of Patent: Jan. 3, 2017

(54) ELECTRO-PERMANENT MAGNETIC ATTACHMENT OF A VEHICLE TO AN OBJECT

(71) Applicant: The Boeing Company, Chicago, IL (US)

(72) Inventors: James J. Troy, Issaquah, WA (US); Gary Ernest Georgeson, Tacoma, WA (US); Scott W. Lea, Renton, WA (US); Karl Edward Nelson, Shoreline, WA (US); Daniel J. Wright, Mercer Island, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 14/623,888

(22) Filed: Feb. 17, 2015

(65) Prior Publication Data

US 2016/0240298 A1 Aug. 18, 2016

(51) Int. Cl.
*B62D 57/024* (2006.01)
*B62D 55/265* (2006.01)
(Continued)

(52) U.S. Cl.
CPC .......... *B62D 57/024* (2013.01); *B62D 55/265* (2013.01); *H01F 7/0257* (2013.01); *B25J 5/007* (2013.01); *B64F 5/0045* (2013.01); *Y10S 901/01* (2013.01)

(58) Field of Classification Search
CPC ..... B62D 55/265; B62D 57/24; B62D 57/028; H01F 7/04
(Continued)

(56) References Cited

U.S. PATENT DOCUMENTS 7,231,826 B2   6/2007   Bossi et al.
7,320,249 B2   1/2008   Georgeson et al.
(Continued)

FOREIGN PATENT DOCUMENTS

DE   4445055 A1   6/1996
EP   0716006 A2   6/1996

OTHER PUBLICATIONS

"Electropermanent magnet," Wikimedia Foundation, Inc., last updated Oct. 2014, 2 pages, accessed Nov. 11, 2014. http://en.wikipedia.org/wiki/Electropermanent_magnet.
(Continued)

*Primary Examiner* — Khoi Tran
*Assistant Examiner* — Dale Moyer
(74) *Attorney, Agent, or Firm* — Yee & Associates, P.C.

(57) ABSTRACT

An apparatus and method for attaching a crawler vehicle to the surface of an object. The crawler vehicle may comprise a frame, a number of moveable surface-engaging components attached to the frame, a number of actuators, and an electro-permanent magnet. The number of actuators is operable to move the frame with respect to the object when the number of moveable surface-engaging components is in contact with the surface of the object. The electro-permanent magnet is operable to hold the number of moveable surface-engaging components in contact with the surface of the object by a magnetic force between the electro-permanent magnet and the object when the electro-permanent magnet is activated and to remove the magnetic force when the electro-permanent magnet is deactivated to release the number of moveable surface-engaging components from the surface of the object.

18 Claims, 7 Drawing Sheets

(51) Int. Cl.
*H01F 7/02* (2006.01)
*G05D 1/00* (2006.01)
*B64F 5/00* (2006.01)
*B25J 5/00* (2006.01)

(58) Field of Classification Search
USPC .......................................................... 901/1
See application file for complete search history.

(56) References Cited

U.S. PATENT DOCUMENTS

| | | | |
|---|---|---|---|
| 8,467,925 B2 | 6/2013 | Troy | |
| 8,678,121 B2 * | 3/2014 | Troy | B25J 5/007 180/167 |
| 8,713,998 B2 | 5/2014 | Troy et al. | |
| 8,738,226 B2 | 5/2014 | Troy et al. | |
| 9,156,321 B2 * | 10/2015 | Troy | B25J 5/007 |
| 2003/0048081 A1 * | 3/2003 | Seemann | B62D 55/00 318/68 |
| 2005/0216125 A1 * | 9/2005 | Huston | B62D 55/265 700/258 |
| 2009/0166102 A1 * | 7/2009 | Waibel | B08B 1/008 180/7.1 |
| 2011/0083599 A1 * | 4/2011 | Kornstein | B63B 59/08 114/222 |
| 2011/0174565 A1 * | 7/2011 | Rochat | B62D 57/024 180/167 |
| 2012/0014759 A1 * | 1/2012 | Sarh | B62D 57/024 408/76 |
| 2013/0020144 A1 * | 1/2013 | Troy | B25J 5/007 180/252 |
| 2013/0024067 A1 * | 1/2013 | Troy | B25J 5/007 701/36 |
| 2013/0140801 A1 * | 6/2013 | Schlee | B62D 57/024 280/762 |
| 2013/0289766 A1 | 10/2013 | Hafenrichter et al. | |
| 2014/0137673 A1 * | 5/2014 | Troy | B25J 5/007 73/865.8 |
| 2014/0200832 A1 | 7/2014 | Troy et al. | |
| 2015/0148949 A1 * | 5/2015 | Chin | G05D 1/0246 700/245 |

OTHER PUBLICATIONS

"Helical Robotics," Helical Robotics, LLC, copyright 2010-2014, 2 pages, Jan. 13, 2015. http://www.helicalrobotics.com/.
"WallBots," UC Berkeley, Living Environments Lab, 4 pages, accessed Nov. 11, 2014. http://www.livenv.net/wallbots.
Troy et al., "Automated Mobile Boom System for Crawling Robots," U.S. Appl. No. 14/176,169, filed Feb. 10, 2014, 54 pages.

* cited by examiner

ELECTRO-PERMANENT MAGNETIC ATTACHMENT OF A VEHICLE TO AN OBJECT

BACKGROUND INFORMATION

1. Field

The present disclosure relates generally to crawler vehicles for moving tools on the surface of an object. More particularly, the present disclosure relates to a method and apparatus for holding a holonomic or other type of crawler vehicle onto the surface of an object using an electro-permanent magnet.

2. Background

A vehicle may move along the surface of an object to perform various tasks at various locations on the object. Such a vehicle may be referred to as a crawler vehicle. For example, without limitation, a crawler vehicle may be capable of holonomic movement on the surface of an object. A vehicle capable of holonomic movement may rotate while moving in any direction across the surface of an object at the same time.

A crawler vehicle may be configured to carry various tools for performing various tasks on an object. For example, without limitation, a crawler vehicle may be configured to carry a number of tools for performing an inspection on the object, repairing the object, or for performing another desired task or various combinations of tasks on the object.

It may be desirable to hold a crawler vehicle on the surface of an object to prevent undesired movement of the vehicle with respect to the surface of the object. For example, without limitation, it may be desirable for a crawler vehicle to move on inclined or substantially vertical surfaces of an object or in other adverse conditions in which undesired movement of the vehicle may occur. In this case, it may be desirable to hold the crawler vehicle on the surface of the object to prevent undesired slipping movement of the vehicle on the surface or to prevent the vehicle from falling off of the object as the vehicle moves on the surface of the object.

Various systems and methods may be used to hold a vehicle on the surface of an object as the vehicle moves on the surface of the object. Some current examples of such systems and methods include systems and methods for holding a crawler vehicle on the surface of an object using a suction force or a magnetic force.

For example, without limitation, a suction force for holding a vehicle on the surface of an object may be generated by a ducted fan or other appropriate mechanism on the vehicle for propelling air from a channel or other space between the vehicle and the surface to create a suction zone. The use of such a suction force for holding a vehicle on the surface of an object may have several limitations. For example, generating the suction force may consume a relatively large amount of energy and the suction force generated may not be sufficient for holding a vehicle on the surface of an object in some cases.

A magnetic force may be used to hold a vehicle on the surface of an object that comprises a ferromagnetic material. Currently, a magnetic force for holding a vehicle on the surface of an object may be provided by a number of permanent magnets or an electromagnet on the vehicle. Holding a vehicle on the surface of an object using permanent magnets may have several limitations. For example, removing a vehicle comprising permanent magnets from the surface of a ferromagnetic object and transporting such a vehicle comprising permanent magnets may be difficult in some cases. Holding a vehicle on the surface of an object using an electromagnet also may have several limitations. For example, generating a magnetic force by an electromagnet on the vehicle may consume a relatively large amount of energy.

Thus, it would be desirable to have a method and apparatus that take into account one or more of the issues discussed above, as well as possible other issues.

SUMMARY

An illustrative embodiment provides an apparatus comprising a frame, a number of moveable surface-engaging components attached to the frame, a number of actuators, and an electro-permanent magnet. An electro-permanent magnet is a type of solid-state permanent magnet-based device in which the strength of the magnetic field can be changed by an electrical input, and then maintained indefinitely in that state without additional electrical energy. The number of actuators is operable to move the frame with respect to an object when the number of moveable surface-engaging components is in contact with a surface of the object. The electro-permanent magnet is operable to hold the number of moveable surface-engaging components in contact with the surface of the object by a magnetic force between the electro-permanent magnet and the object when the electro-permanent magnet is activated and to remove the magnetic force when the electro-permanent magnet is deactivated to release the number of moveable surface-engaging components from the surface of the object.

An illustrative embodiment also provides an apparatus comprising a frame, a number of moveable surface-engaging components attached to the frame, a number of actuators, an electro-permanent magnet, and a suction device. The number of actuators is operable to move the frame with respect to an object when the number of moveable surface-engaging components is in contact with a surface of the object. The electro-permanent magnet is operable to hold the number of moveable surface-engaging components in contact with the surface of the object by a magnetic force between the electro-permanent magnet and the object when the electro-permanent magnet is activated and the apparatus is on a portion of the object that is ferromagnetic. The suction device is operable to provide a suction force to hold the number of moveable surface-engaging components in contact with the surface of the object when the suction device is activated.

An illustrative embodiment also provides a method of operating a vehicle on a surface of an object. The vehicle comprises a frame, a number of moveable surface-engaging components attached to the frame, a number of actuators, and an electro-permanent magnet. The vehicle is placed on the surface of the object. The electro-permanent magnet is activated to hold the number of moveable surface-engaging components in contact with the surface of the object by a magnetic force between the electro-permanent magnet and a portion of the object that is ferromagnetic. The number of actuators is operated to move the frame with respect to the object when the number of moveable surface-engaging components is held in contact with the surface of the object.

An illustrative embodiment also provides another method of operating a vehicle on a surface of an object. The vehicle comprises a frame, a number of moveable surface-engaging components attached to the frame and held in contact with the surface of the object, a number of actuators, and an electro-permanent magnet. The number of actuators is operated to move the frame with respect to the object when the number of moveable surface-engaging components is held in contact with the surface of the object. The electro-permanent magnet is activated to reduce undesired movement of the vehicle by providing eddy current braking when the vehicle is on a portion of the object that is electrically conductive.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the disclosure are set forth in the appended claims. The disclosure itself, however, as well as a preferred mode of use, further objectives and advantages thereof, will best be understood by reference to the following detailed description of an illustrative embodiment of the present disclosure when read in conjunction with the accompanying drawings, wherein:

DETAILED DESCRIPTION

Figure 1:
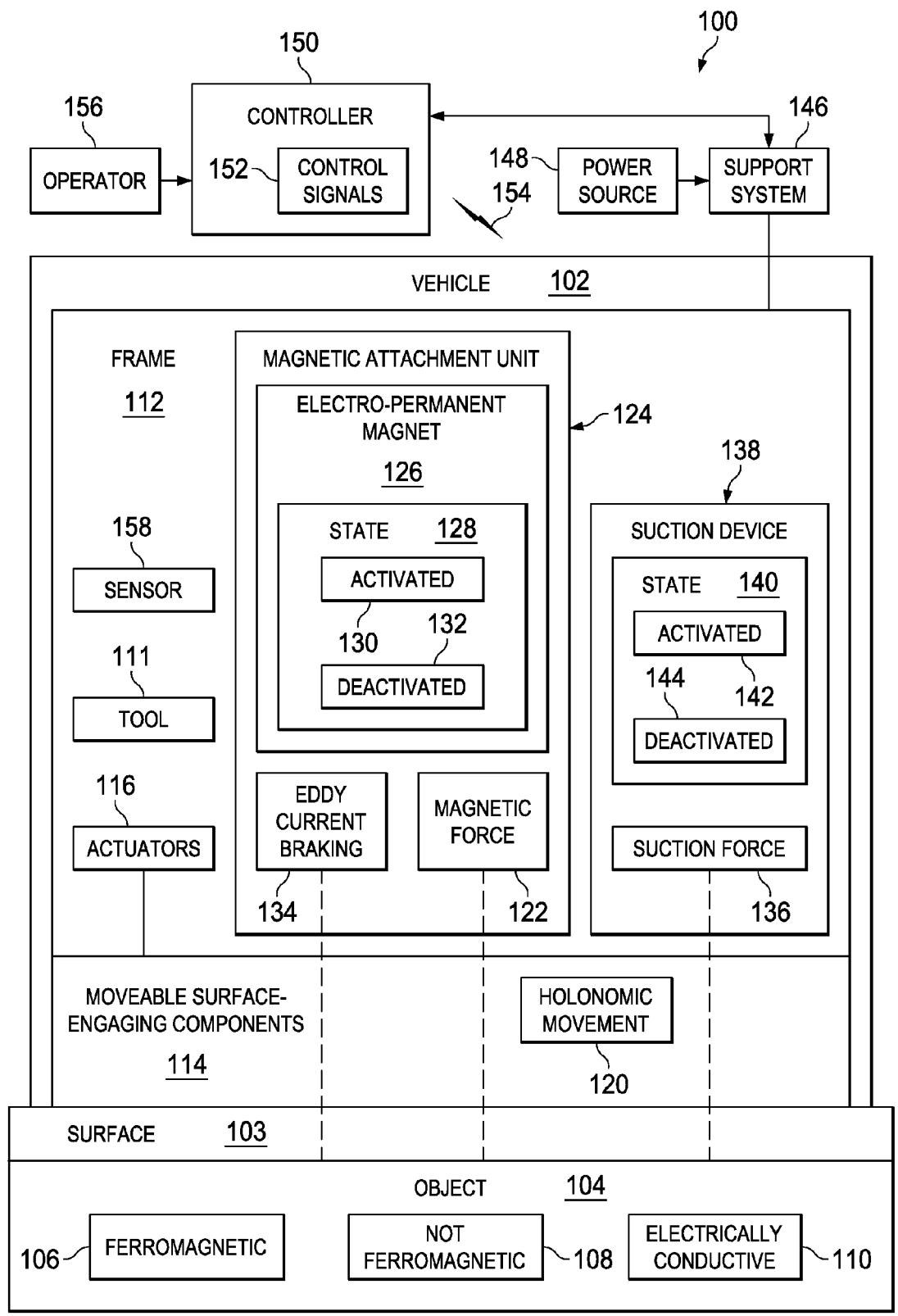
FIG. 1 is an illustration of a block diagram of an operating environment for a vehicle on a surface of an object in accordance with an illustrative embodiment.

Different illustrative embodiments recognize and take into account a number of different considerations. "A number," as used herein with reference to items, means one or more items. For example, "a number of different considerations" are one or more different considerations.

The different illustrative embodiments recognize and take into account that a suction force may be used to hold a vehicle on the surface of an object. A suction force may be used to hold a vehicle on the surface of an object that either does or does not comprise a ferromagnetic material. However, a suction force may not hold a vehicle effectively on an object that has surface irregularities, gaps, or other characteristics that may prevent the generation of sufficient suction force between the vehicle and the surface of the object. Generally, the ability of a suction force to hold relatively heavy vehicles on the surface of an object may be limited.

A fan or other mechanism on a vehicle may need to be operated continuously to generate a suction force as long as the suction force is needed or desired for holding the vehicle on the surface of an object. Holding a vehicle on the surface of an object using a suction force thus may consume a relatively large amount of energy.

The different illustrative embodiments recognize and take into account that a magnetic force may be used to hold a vehicle on the surface of an object that comprises ferromagnetic material. A magnetic force may be used to hold relatively heavy vehicles on the surface of such a ferromagnetic object. A magnetic force may be used to hold a vehicle on the surface of an object that is not ferromagnetic by placing a magnet or appropriate ferromagnetic material on an opposite side of the object from the surface of the object on which the vehicle is operating. Magnets on the opposite side of a non-ferrous material allow the magnetic coupling process to work in a similar way by providing an attractive force. However, placing magnets on the opposite side of a non-ferromagnetic object in this manner so that a vehicle may be held on the object by a magnetic force may be difficult or impossible in some cases, depending, for example, on the structure of the object. The different illustrative embodiments recognize and take into account that a magnetic force for holding a vehicle on the surface of an object may be provided by a number of permanent magnets or an electromagnet on the vehicle.

The different illustrative embodiments recognize and take into account that the magnetic force provided by a permanent magnet on a vehicle may not be turned off. Therefore, it may be difficult to remove a vehicle from the surface of a ferromagnetic object when the vehicle is held on the object by a magnetic force provided by permanent magnets on the vehicle. Removing a vehicle held on the surface of a ferromagnetic object by permanent magnets may be particularly difficult when the vehicle needs to be removed from a location on the object that is difficult to access. Transporting a vehicle including permanent magnets may require special or relatively large packaging to prevent the magnetic fields produced by the permanent magnets on the vehicle from causing undesired effects during transportation.

The different illustrative embodiments also recognize and take into account that an electromagnet provides an electromagnetic force only when electrical power is provided to the electromagnet. Power may need to be provided continuously to an electromagnet on a vehicle to generate a magnetic force as long as the magnetic force is needed or desired for holding the vehicle on the surface of a ferromagnetic object. Continuously holding a vehicle on the surface of a ferromagnetic object using a magnetic force provided by an electromagnet on the vehicle thus may use a relatively large amount of energy.

The different illustrative embodiments recognize and take into account that a magnetic force provided by an electro-permanent magnet may be turned on and off, like an electromagnet. The different illustrative embodiments also recognize and take into account that an electro-permanent magnet has no power consumption during steady-state operation to provide a magnetic force, like a permanent magnet. An electro-permanent magnet comprises both an electromagnet made of a magnetically "semi-hard" material that is relatively easy to magnetize and de-magnetize, and a permanent magnet that is magnetically "hard" and difficult to de-magnetize. A magnetic field produced by the electromagnet in the electro-permanent magnet is used to change the magnetization of the magnetically semi-hard material to turn the magnetic behavior of the electro-permanent magnet on and off. The only power consumption required for operation of an electro-permanent magnet is during relatively short periods of time when power is provided to the electro-permanent magnet to change a state of the electro-permanent magnet from not providing a magnetic force to providing a magnetic force and from providing a magnetic force to not providing a magnetic force.

Illustrative embodiments provide a system and method for holding a vehicle on the surface of an object using a magnetic force provided by an electro-permanent magnet on the vehicle. A system and method in accordance with an illustrative embodiment provide the advantages of holding a vehicle on the surface of an object using a magnetic force while overcoming many of the limitations of holding a vehicle on the surface of an object using a suction force or using a magnetic force provided by permanent magnets or an electromagnet on the vehicle.

An electro-permanent magnet may provide sufficient magnetic force to hold a relatively heavy vehicle in accordance with an illustrative embodiment on the surface of a ferromagnetic object. An electro-permanent magnet may be used to provide a magnetic force to hold a vehicle in accordance with an illustrative embodiment on the surface of a ferromagnetic object wherein the surface is irregular or has other characteristics that may prevent the generation of sufficient suction force to hold a vehicle on the surface of the object.

An electro-permanent magnet on a vehicle in accordance with an illustrative embodiment may be activated to provide a magnetic force only when needed to hold the vehicle on the surface of a ferromagnetic object. The magnetic force provided by an electro-permanent magnet on a vehicle in accordance with an illustrative embodiment may be deactivated to more easily remove the vehicle from a ferromagnetic object on which the vehicle is operated and to transport the vehicle without requiring special or large packaging.

An electro-permanent magnet on a vehicle in accordance with an illustrative embodiment uses electrical power for only a relatively short time to change between activated and deactivated states. Therefore, a vehicle in accordance with an illustrative embodiment may consume less energy to hold the vehicle on an object using a magnetic force provided by an electro-permanent magnet than a vehicle that is held on an object using either a suction force or a magnetic force provided by an electromagnet, either of which may require a continuous consumption of power to hold a vehicle on the surface of an object.

Illustrative embodiments also provide a system and method for holding a vehicle on the surface of an object using a suction force and a magnetic force. A vehicle in accordance with an illustrative embodiment may comprise both a suction device, for providing a suction force for holding the vehicle on the surface of an object, and an electro-permanent magnet, for providing a magnetic force for holding the vehicle on the surface of an object.

For example, without limitation, a vehicle in accordance with an illustrative embodiment comprising both a suction device and an electro-permanent magnet may be operated effectively and efficiently to hold the vehicle on the surface of an object as the vehicle moves across the surface of an object that includes portions that are ferromagnetic and portions that are not ferromagnetic. The electro-permanent magnet on such a vehicle in accordance with an illustrative embodiment may be activated to provide a magnetic force to hold the vehicle on the surface of a portion of the object that is ferromagnetic. The suction device on the vehicle may be deactivated to save energy when the vehicle is on the portion of the object that is ferromagnetic. Although the suction force provided by the suction device may be sufficient to hold the vehicle on the surface of the ferromagnetic portion of the object, it may be more efficient to turn off the suction device and hold the vehicle on the surface of the ferromagnetic portion of the object using only the magnetic force provided by the electro-permanent magnet on the vehicle. The suction device may be activated to hold the vehicle on the surface of the object by a suction force when the vehicle moves onto a portion of the object that is not ferromagnetic. The electro-permanent magnet on the vehicle may not provide a magnetic force to hold the vehicle on the surface of the object when the vehicle is on a portion of the object that is not ferromagnetic.

Illustrative embodiments also provide a system and method for using an electro-permanent magnet on a vehicle to reduce undesired movement of the vehicle with respect to the surface of an object that is electrically conductive. An electro-permanent magnet on a vehicle in accordance with an illustrative embodiment may be activated to reduce undesired movement of the vehicle by providing eddy current braking when the vehicle is on a portion of the object that is electrically conductive. For example, without limitation, an electro-permanent magnet on a vehicle in accordance with an illustrative embodiment may be activated to provide eddy current braking to slow the undesired movement of a vehicle that is falling from an electrically conductive object due to loss of attachment to the object.

Turning to FIG. 1, an illustration of a block diagram of an operating environment for a vehicle on the surface of an object is depicted in accordance with an illustrative embodiment. Operating environment 100 may comprise any appropriate environment in which vehicle 102 may be moved along surface 103 of object 104 to perform any appropriate task or action on object 104.

Object 104 may comprise any appropriate object on which any desired task or action may be performed by vehicle 102. For example, without limitation, object 104 may comprise a portion of an aircraft, a storage tank, a tooling fixture, a portion of a building, or any other appropriate object.

Object 104 may be ferromagnetic 106 or not ferromagnetic 108. Alternatively, a number of portions of object 104 may be ferromagnetic 106 and another number of portions of object 104 may be not ferromagnetic 108. For example, without limitation, object 104 or a portion of object 104 may be ferromagnetic when object 104 or the portion of object 104 comprises a ferromagnetic material. In the present application, including in the claims, an object or a portion of an object is considered to be "ferromagnetic" whenever sufficient magnetic attraction may be provided between a vehicle and the object or the portion of the object to hold the vehicle on the surface of the object by a magnetic force.

Object 104 or a number of portions of object 104 may be electrically conductive 110. For example, without limitation, object 104 or a portion of object 104 may be electrically conductive when object 104 or the portion of object 104 comprises an electrically conductive material. Object 104 or a portion of object 104 may be electrically conductive 110 and ferromagnetic 106. Alternatively, object 104 or a portion of object 104 may be electrically conductive 110 and not ferromagnetic 108. For example, without limitation, object 104 comprising aluminum may be electrically conductive 110 and not ferromagnetic 108.

Surface 103 of object 104 that is ferromagnetic 106 may or may not be ferromagnetic. Surface 103 of object 104 that is electrically conductive 110 may or may not be electrically conductive. For example, without limitation, surface 103 of object 104 comprising ferromagnetic 106 material or electrically conductive 110 material may comprise a material that is neither ferromagnetic nor electrically conductive. Nevertheless, in this example, object 104 may be considered ferromagnetic 106 or electrically conductive 110, or both, when a magnetic field produced on vehicle 102 may extend through surface 103 of object 104 to the ferromagnetic 106 or electrically conductive material comprising object 104.

Vehicle 102 may be configured to perform any desired task or other action on object 104. For example, without limitation, vehicle 102 may be configured to perform an inspection, make a repair, assemble, disassemble, or perform any other desired task or various combinations of tasks on object 104.

A desired task or other action may be performed on object 104 using tool 111. Tool 111 may include any appropriate number of tools for performing any number of tasks or other actions on object 104. For example, without limitation, tool 111 may include a camera, a sensor, a laser, a cutting tool, a drill, a spray nozzle, a marking instrument, or any other appropriate tool or combination of tools for performing any desired task or other action on object 104.

Vehicle 102 may be configured to move tool 111 across surface 103 of object 104 to perform tasks or other actions at various locations on object 104 using tool 111. For example, without limitation, tool 111 may be attached either directly or indirectly to frame 112 of vehicle 102 in any appropriate manner.

Vehicle 102 may comprise frame 112, moveable surface-engaging components 114, and actuators 116. Frame 112 may comprise any appropriate structure to which various other components of vehicle 102 may be attached to form vehicle 102. The various components of vehicle 102 may be attached directly or indirectly to frame 112 in any appropriate manner.

Moveable surface-engaging components 114 may comprise any appropriate number of appropriate moveable structures or other components that may be configured to provide physical contact between vehicle 102 and surface 103 of object 104 as vehicle 102 moves on surface 103 of object 104. For example, without limitation, moveable surface-engaging components 114 may include wheels, rollers, tracks, legs, feet, or other appropriate moveable structures or other components for engaging surface 103 of object 104.

Actuators 116 may comprise any appropriate number of devices that may be operable to move vehicle 102 on surface 103 of object 104 when moveable surface-engaging components 114 are held in contact with surface 103 of object 104. For example, without limitation, actuators 116 may be connected to moveable surface-engaging components 114 and operable to move moveable surface-engaging components 114 thereby to move vehicle 102 on surface 103 of object 104 when moveable surface-engaging components 114 are held in contact with surface 103 of object 104. For example, without limitation, actuators 116 may comprise electric motors or any other appropriate devices for moving vehicle 102 on surface 103 of object 104 when moveable surface-engaging components 114 are held in contact with surface 103 of object 104.

Moveable surface-engaging components 114 and actuators 116 may be configured to provide holonomic movement 120 of vehicle 102 on surface 103 of object 104. Vehicle 102 capable of holonomic movement 120 may simultaneously rotate while moving in any direction across surface 103 of object 104. For example, without limitation, moveable surface-engaging components 114 may comprise a plurality of Mecanum wheels. A Mecanum wheel is a type of wheel comprising multiple individual rollers. Mecanum wheels used in pairs on vehicle 102 may allow holonomic movement 120 of vehicle 102 on surface 103 of object 104.

Vehicle 102 may be configured to be held on surface 103 of object 104 that is ferromagnetic 106 by magnetic force 122. Magnetic force 122 may be provided between vehicle 102 and object 104 or portion of object 104 that is ferromagnetic 106 to hold moveable surface-engaging components 114 in contact with surface 103 of object 104 when vehicle 102 is moving on surface 103 of object 104. Magnetic force 122 preferably is sufficient to hold vehicle 102 on surface 103 of object 104 or portion of object 104 that is ferromagnetic 106 to prevent undesired movement of vehicle 102 with respect to object 104.

Magnetic force 122 may be provided by magnetic attachment unit 124 on vehicle 102. One magnetic attachment unit 124 or more than one magnetic attachment unit 124 may be provided on vehicle 102 to provide magnetic force 122 for holding vehicle 102 on object 104 or portion of object 104 that is ferromagnetic 106. Magnetic attachment unit 124 may be attached to vehicle 102 in any appropriate manner. For example, magnetic attachment unit 124 may be attached to frame 112 of vehicle 102. For example, without limitation, magnetic attachment unit 124 may be mounted in an appropriate receptacle formed in frame 112 to hold magnetic attachment unit 124 or otherwise may be attached to frame 112 of vehicle 102 in any other appropriate manner.

In accordance with an illustrative embodiment, magnetic attachment unit 124 may comprise electro-permanent magnet 126 for providing magnetic force 122. Magnetic attachment unit 124 may comprise one electro-permanent magnet 126 or more than one electro-permanent magnet 126. Any appropriate type of electro-permanent magnet 126 may be used in magnetic attachment unit 124. For example, without limitation, electro-permanent magnet 126 in magnetic attachment unit 124 may be configured to provide magnetic force 122 that is either fixed or adjustable.

State 128 of electro-permanent magnet 126 may be activated 130 or deactivated 132. Electro-permanent magnet 126 provides magnetic force 122 when electro-permanent magnet 126 is activated 130. For example, without limitation, electro-permanent magnet 126 may be activated 130 to provide magnetic force 122 to hold vehicle 102 on surface 103 of object 104 when vehicle 102 is operated on surface 103 of object 104 or portion of object 104 that is ferromagnetic 106 to perform a number of tasks on object 104. Electro-permanent magnet 126 does not provide magnetic force 122 when electro-permanent magnet 126 is deactivated 132. For example, without limitation, electro-permanent magnet 126 may be deactivated 132 to remove vehicle 102 from surface 103 of object 104 that is ferromagnetic 106 or to transport vehicle 102.

State 128 of electro-permanent magnet 126 may be changed from activated 130 to deactivated 132 and vice versa by providing electrical power to electro-permanent magnet 126. After state 128 of electro-permanent magnet 126 is changed, electrical power need not be provided to electro-permanent magnet 126 to maintain state 128 of electro-permanent magnet 126. For example, without limitation, electrical power need not be provided continually to electro-permanent magnet 126 to maintain magnetic force 122 provided by electro-permanent magnet 126 for holding vehicle 102 on surface 103 of object 104 or portion of object 104 that is ferromagnetic 106.

For example, without limitation, electro-permanent magnet 126 may be activated 130 to provide magnetic force 122 in response to a first signal providing electrical power to electro-permanent magnet 126. Electro-permanent magnet 126 may then remain activated 130 after the first signal stops. Electro-permanent magnet 126 then may be deactivated 132 in response to a second signal providing electrical power to electro-permanent magnet 126. Electro-permanent magnet 126 may then remain deactivated 132 after the second signal stops.

In accordance with an illustrative embodiment, electro-permanent magnet 126 on vehicle 102 may be activated 130 to reduce undesired movement of vehicle 102 by providing eddy current braking 134 when vehicle 102 is on object 104 or portion of object 104 that is electrically conductive 110. Eddy current braking 134 also may be referred to as magnetic induction braking or electromagnetic braking.

Electro-permanent magnet 126 on vehicle 102 produces a magnetic field when electro-permanent magnet 126 is activated 130. Movement of vehicle 102 with respect to object 104 will cause the magnetic field produced by electro-permanent magnet 126 on vehicle 102 to move with respect to object 104. The movement of the magnetic field produced by electro-permanent magnet 126 with respect to object 104 or portion of object 104 that is electrically conductive 110 will induce circulating electric currents, called eddy currents, in object 104. The circulating currents induced in electrically conductive 110 material of object 104 create a magnetic field that opposes the magnetic field produced by electro-permanent magnet 126 on vehicle 102. Electro-permanent magnet 126 on vehicle 102 moving with respect to object 104 or portion of object 104 that is electrically conductive 110 will experience a drag force from the magnetic field produced by the eddy currents induced in object 104. The magnitude of this drag force is proportional to the speed of movement of electro-permanent magnet 126 with respect to object 104 or portion of object 104 that is electrically conductive 110. Therefore, the force provided by eddy current braking 134 to reduce undesired movement of vehicle 102 with respect to object 104 may increase as the speed of undesired movement of vehicle 102 with respect to object 104 increases.

For example, undesired movement of vehicle 102 may include slipping of vehicle 102 on surface 103 of object 104 or vehicle 102 falling along surface 103 of object 104 after losing attachment to object 104. For example, without limitation, undesired movement of vehicle 102 with respect to object 104 may be caused by the interruption or inadequacy of a holding force that may be used to hold vehicle 102 on surface 103 of object 104. Eddy current braking 134 provided by electro-permanent magnet 126 on vehicle 102 may slow down or otherwise reduce such undesired movement. For example, without limitation, reducing the undesired movement of vehicle 102 with respect to object 104 by eddy current braking 134 may allow an adequate force for holding vehicle 102 on surface 103 of object 104 to be restored or may reduce undesired effects on vehicle 102 that may result from vehicle falling from object 104.

Vehicle 102 also may be configured to be held on surface 103 of object 104 by suction force 136. Suction force 136 may be provided between vehicle 102 and surface 103 of object 104 to hold moveable surface-engaging components 114 in contact with surface 103 of object 104 when vehicle 102 is moving on surface 103 of object 104. Suction force 136 preferably is sufficient to hold vehicle 102 on surface 103 of object 104 to prevent undesired movement of vehicle 102 with respect to object 104.

Suction force 136 may be used to hold vehicle 102 on surface 103 of object 104 or portion of object 104 that is ferromagnetic 106 or not ferromagnetic 108. However, suction force 136 may not be used to hold vehicle 102 on surface 103 of object 104 when surface 103 of object 104 is not sufficiently uniform or has other characteristics that may prevent the creation of adequate suction force 136 between vehicle 102 and surface 103 of object 104.

Suction force 136 may be provided by suction device 138 on vehicle 102. One suction device 138 or more than one suction device 138 may be provided on vehicle 102 to provide suction force 136 for holding vehicle 102 on surface 103 of object 104. Suction device 138 may be attached to vehicle 102 in any appropriate manner. For example, suction device 138 may be attached to frame 112 of vehicle 102. For example, without limitation, suction device 138 may be mounted in an appropriate receptacle formed in frame 112 to hold suction device 138 or otherwise may be attached to frame 112 of vehicle 102 in any other appropriate manner.

Suction device 138 may be configured to provide suction force 136 for holding vehicle 102 on surface 103 of object 104 in any appropriate manner. For example, without limitation, suction device 138 may comprise a ducted fan or other appropriate mechanism for propelling air from a channel or other space between vehicle 102 and surface 103 of object 104 to create suction force 136.

State 140 of suction device 138 may be activated 142 or deactivated 144. Suction device 138 provides suction force 136 when suction device 138 is activated 142. Suction device 138 does not provide suction force 136 when suction device 138 is deactivated 144. Electrical power may need to be provided continuously to operate suction device 138 to provide suction force 136 for holding vehicle 102 on surface 103 of object 104 when suction device 138 is activated 142.

Energy efficient operation of vehicle 102 on surface 103 of object 104 may be achieved by deactivating suction device 138 and activating electro-permanent magnet 126 to provide magnetic force 122 to hold vehicle 102 on surface 103 of object 104 when vehicle 102 is operated on object 104 or portion of object 104 that is ferromagnetic 106. Suction device 138 may be activated 142 to provide suction force 136 to hold vehicle 102 on surface 103 of object 104 only when vehicle 102 is operated on object 104 or portion of object 104 that is not ferromagnetic 108. For example, without limitation, suction device 138 may be activated 142 and deactivated 144 as vehicle 102 moves across surface 103 of object 104 comprising portions that are ferromagnetic 106 and portions that are not ferromagnetic 108 such that suction device 138 is only activated 142 to provide suction force 136 for holding vehicle 102 on surface 103 of object 104 when vehicle 102 is on a portion of object 104 that is not ferromagnetic 108. Electro-permanent magnet 126 may or may not be deactivated 132 when vehicle 102 moves across a portion of object 104 that is not ferromagnetic 108.

Vehicle 102 may be physically attached to support system 146 in operating environment 100. For example, without limitation, support system 146 may be attached to frame 112 of vehicle 102. Support system 146 may be configured to move vehicle 102 with respect to object 104 when vehicle 102 is not held on surface 103 of object 104 by magnetic force 122 or suction force 136. For example, without limitation, support system 146 may be used to place vehicle 102 on surface 103 of object 104 or to remove vehicle 102 from surface 103 of object 104. Examples of support system 146 are described in more detail below with reference to FIG. 4 and FIG. 5.

Power for the operation of various components on vehicle 102 may be provided by power source 148. Power source 148 may comprise any appropriate number of sources of power for the operation of tool 111, actuators 116, suction device 138, or any other component or combination of components on vehicle 102. For example, power source 148 may comprise any appropriate number and type of sources of electrical power. For example, without limitation, power source 148 may include a source of electrical power for changing state 128 of electro-permanent magnet 126 on vehicle 102.

Power source 148 may be located off of vehicle 102. Alternatively, or in addition, a portion of power source 148 may be provided on vehicle 102. Electrical power may be provided to vehicle 102 from power source 148 located off of vehicle 102 via a number of wires. For example, without limitation, support system 146 may comprise a number of wires for carrying electrical power from power source 148 to vehicle 102.

Operation of various components on vehicle 102 may be controlled by controller 150. For example, without limitation, controller 150 may be configured to generate appropriate control signals 152 for controlling the operation of tool 111, actuators 116, magnetic attachment unit 124, suction device 138, or any other component or combination of components on vehicle 102 in a desired manner.

Controller 150 may be implemented in hardware or in hardware in combination with software. For example, controller 150 may comprise a computer or another appropriate data processing system or processor unit.

Controller 150 may be located off of vehicle 102. Alternatively, some or all of the functionality of controller 150 may be provided on vehicle 102. Control signals 152 may be provided to vehicle 102 from controller 150 located off of vehicle 102 via a number of physical connections. For example, without limitation, support system 146 may comprise a number of wires, fiber optic cables, or other appropriate physical structures for carrying control signals 152 from controller 150 to vehicle 102. Alternatively, or in addition, control signals 152 may be provided to vehicle 102 from controller 150 located off of vehicle 102 via a number of appropriate wireless connections 154.

Control signals 152 for controlling the operation of various components on vehicle 102 may be generated automatically by controller 150. Alternatively, or in addition, control signals 152 for controlling the operation of various components on vehicle 102 may be generated by controller 150 in combination with a human operator 156.

Information that may be useful for controlling the operation of various components on vehicle 102 in a desired manner may be provided by various sensors 158. Sensors 158 may be located on vehicle 102, off of vehicle 102, or both on vehicle 102 and off of vehicle 102.

Information from sensors 158 may be provided to controller 150 via any appropriate wired, wireless, or other appropriate connection or various combinations of connections. For example, without limitation, support system 146 may comprise a number of wires, fiber optic cables, or other appropriate physical structures for carrying information from sensors 158 on vehicle 102 to controller 150 located off of vehicle 102.

Sensors 158 may include any appropriate number and type of sensors for providing any appropriate information that may be useful for controlling the operation of any components on vehicle 102 in a desired manner. For example, without limitation, sensors 158 may be configured to provide information that may be used to determine whether vehicle 102 is on a portion of object 104 that is ferromagnetic 106, not ferromagnetic 108, or electrically conductive 110. As another example, without limitation, sensors 158 may be configured to identify undesired movement of vehicle 102 with respect to object 104.

Figure 2:
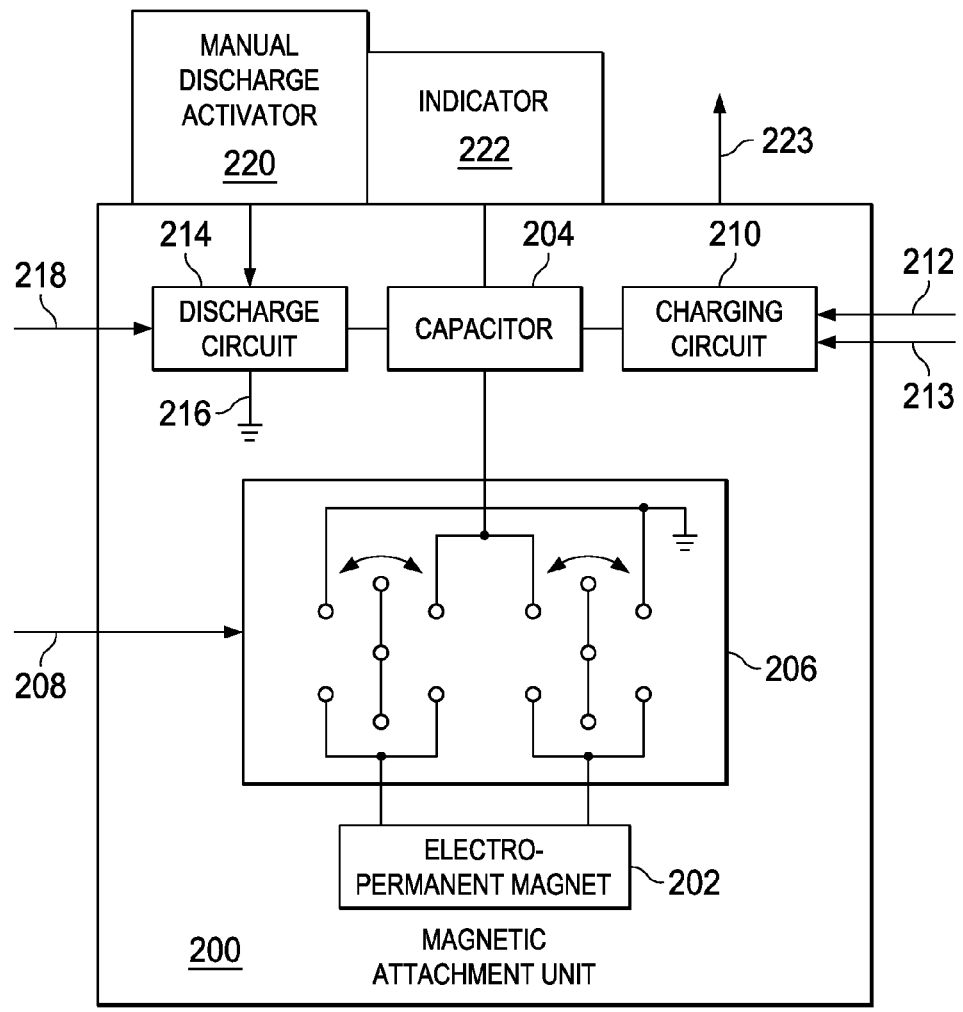
FIG. 2 is an illustration of a block diagram of a magnetic attachment unit for a vehicle in accordance with an illustrative embodiment.

Turning to FIG. 2, an illustration of a block diagram of a magnetic attachment unit for a vehicle is depicted in accordance with an illustrative embodiment. Magnetic attachment unit 200 may be an example of one implementation of magnetic attachment unit 124 in FIG. 1.

Magnetic attachment unit 200 may include electro-permanent magnet 202. Electrical power for changing the state of electro-permanent magnet 202 may be stored in capacitor 204. Capacitor 204 may comprise any appropriate number of capacitors. A relatively high current signal may be provided from capacitor 204 to electro-permanent magnet 202 via switching device 206 to change the state of electro-permanent magnet 202. For example, switching device 206 may be configured to provide current from capacitor 204 to electro-permanent magnet 202 alternatively in one direction to change the state of electro-permanent magnet 202 from activated to deactivated and in the opposite direction to change the state of electro permanent magnet 202 from deactivated to activated. A control signal may be provided from a controller on line 208 to operate switching device 206 in the appropriate manner to activate or deactivate electro-permanent magnet 202 as desired. For example, without limitation, switching device 206 may be implemented using appropriate solid state switching devices or in any other appropriate manner.

Capacitor 204 may be charged in an appropriate manner via charging circuit 210. For example, charging circuit 210 may be configured to charge capacitor 204 from a relatively low current power provided from an appropriate power source to charging circuit 210 on line 212. Operation of charging circuit 210 to charge capacitor 204 may be controlled by appropriate control signals provided from a controller to charging circuit 210 on line 213.

Discharge circuit 214 may be configured to discharge capacitor 204. For example, without limitation, discharge circuit 214 may be configured to discharge capacitor 204 through a resistor to ground 216 in response to a control signal provided from a controller to discharge circuit 214 on line 218. Alternatively, or in addition, discharge circuit 214 may discharge capacitor 204 in response to activation of manual discharge actuator 220 by a human operator.

Indicator 222 may be configured to indicate when capacitor 204 is charged at a sufficient level for activation of the electro-permanent magnet 202, or charged at more than a desired level for safety. For example, without limitation, indicator 222 may comprise a light emitting diode or other appropriate indicator device. Alternatively, or in addition, indicator 222 may be configured to indicate when capacitor 204 is charged at more than a desired level for safety by providing a signal to a controller on line 223.

Manual discharge actuator 220 and indicator 222 may be implemented in combination. For example, without limitation, indicator 222 may be implemented using a light emitting diode mounted in a push button for implementing manual discharge actuator 220.

Figure 3:
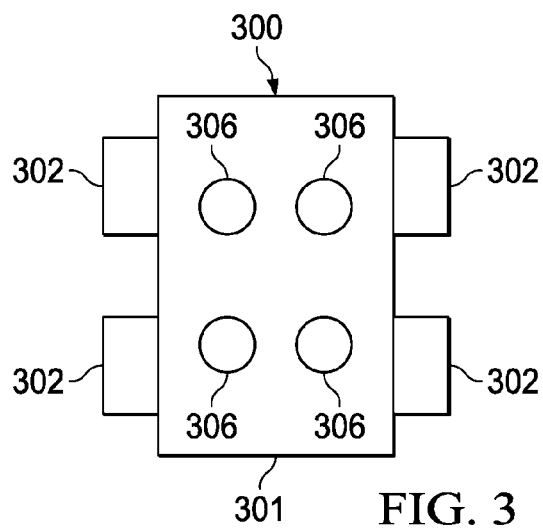
FIG. 3 is an illustration of a bottom view of a vehicle in accordance with an illustrative embodiment.

Turning to FIG. 3, an illustration of a bottom view of a vehicle is depicted in accordance with an illustrative embodiment. Vehicle 300 may be an example of one implementation of vehicle 102 in FIG. 1.

Vehicle 300 comprises frame 301. Number of moveable surface-engaging components 302 is attached to frame 301. In this example, number of moveable surface-engaging components 302 comprises wheels. A vehicle in accordance with an illustrative embodiment may have more or fewer than four wheels or other appropriate moveable surface-engaging components.

Frame 301 may include number of receptacles 306. Each one of number of receptacles 306 may be configured to hold either a magnetic attachment unit or a suction device in accordance with an illustrative embodiment. Therefore, vehicle 300 may be configured as desired to use any appropriate combination of magnetic attachment units and suction devices for holding vehicle 300 on an object. A vehicle in accordance with an illustrative embodiment may have more or fewer than four receptacles for holding more or fewer than four magnetic attachment units or magnetic attachment units and suction devices in any combination.

Figure 4:
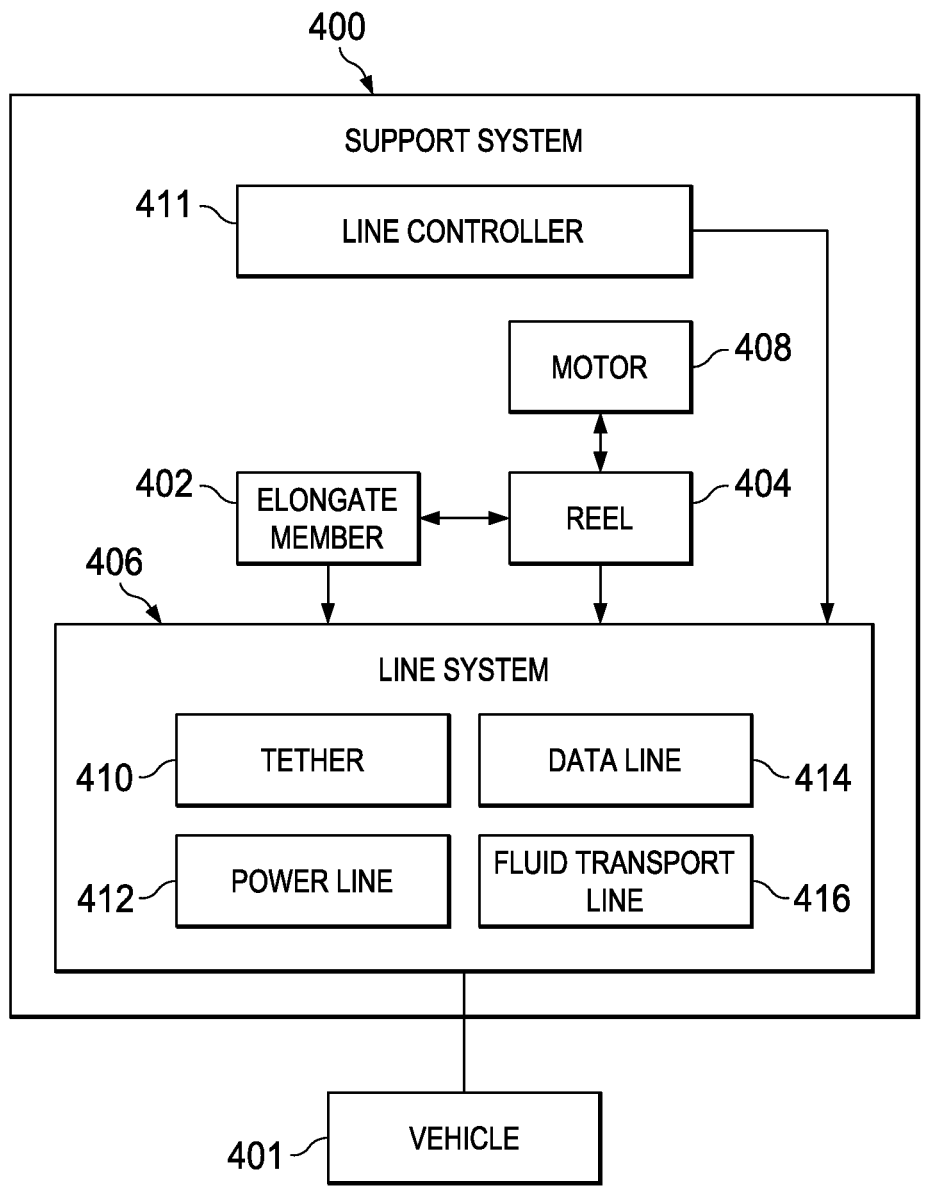
FIG. 4 is an illustration of a block diagram of a support system for a vehicle in accordance with an illustrative embodiment.

Turning to FIG. 4, an illustration of a block diagram of a support system for a vehicle is depicted in accordance with an illustrative embodiment. Support system 400 for vehicle 401 may be an example of one implementation of support system 146 for vehicle 102 in FIG. 1.

Support system 400 may include elongate member 402. Reel 404 may be connected to elongate member 402. Line system 406 may be connected to reel 404 and elongate member 402. Line system 406 connects support system 400 to vehicle 401.

Elongate member 402 may take various forms. For example, elongate member 402 may be a rod, a boom, or some other suitable type of elongate member. In some cases, elongate member 402 also may be flexible.

In these illustrative examples, line system 406 comprises one or more lines. Line system 406 may restrict or aide in managing movement of vehicle 401.

For example, reel 404 may be a tensionable reel and may include a brake unit. Reel 404 may be configured to hold a line in line system 406 and supply a level of tension to the line. Further, reel 404 may reduce the slack in line system 406. A tensionable reel is a reel in which the reel is biased to rotate in a direction to take up slack that may occur in line system 406. The brake unit may halt and/or reduce the rate at which the line being held by reel 404 is allowed to be drawn out from the reel.

As a result, support system 400 may reduce or eliminate potential damage to equipment and risk to personnel in the operating environment due to an undesired release of vehicle 401 from the surface of an object. An undesired release of vehicle 401 from the surface of an object may be, for example, a slippage, falling, or sliding of vehicle 401 when vehicle 401 is on the surface of an object. In this manner, support system 400 may provide the equivalent of a safety net for vehicle 401.

Motor 408 may be used to turn reel 404 if a tensionable reel is not present. In particular, motor 408 may turn reel 404 in a manner that increases tension or reduces slack in line system 406. Reel 404 may increase tension in line system 406 in a manner that may reduce or halt movement of vehicle 401. Further, reel 404 also may be used in lifting and/or moving vehicle 401 in some illustrative examples.

Additionally, in these illustrative examples, support system 400 may include line controller 411. Line controller 411 may be configured to control lines in line system 406 connected to line controller 411 to perform one or more of supporting vehicle 401 in response to an undesired release of vehicle 401 from the surface of an object, slowing the movement of vehicle 401, halting the movement of vehicle 401, supporting vehicle 401 as vehicle 401 moves on the surface of an object, lifting vehicle 401, or other suitable operations.

Further, line controller 411 also may be configured to control a set of lines in line system 406 in response to a number of commands. Line controller 411 also may control motor 408 and/or reel 404 to control line system 406. In other illustrative examples, line controller 411 may not be present in support system 400.

In these illustrative examples, line system 406 includes tether 410, power line 412, data line 414, and fluid transport line 416. Line system 406 may include fewer, more, or other types of lines depending on the implementation. Tether 410 provides support for controlling movement of vehicle 401. Power line 412 may provide power to vehicle 401. Data line 414 may provide a communications link for vehicle 401. Fluid transport line 416 may carry fluids, such as water.

Figure 5:
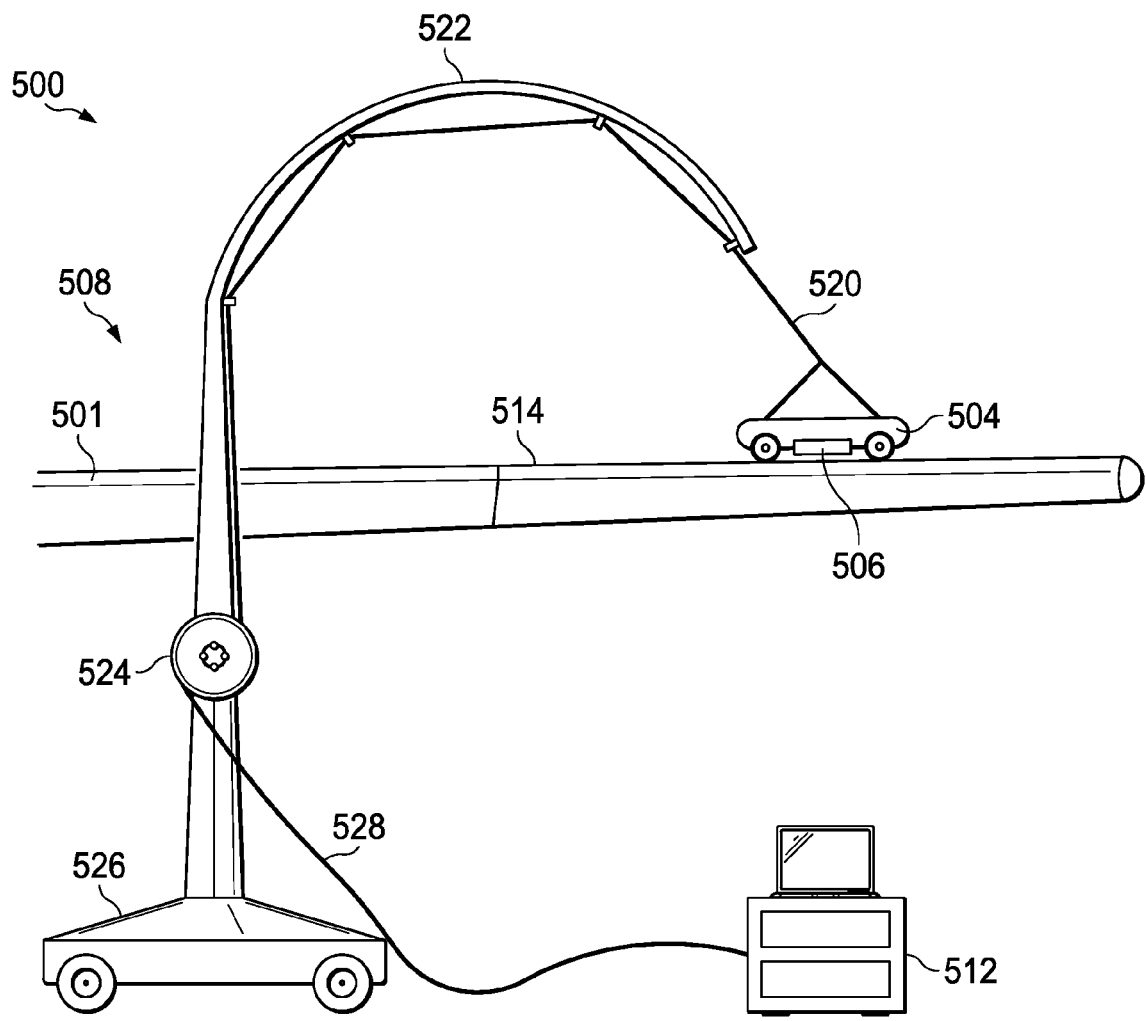
FIG. 5 is an illustration of an example of an operating environment for a vehicle on a surface of an object in accordance with an illustrative embodiment.

Turning now to FIG. 5, an illustration of an example of an operating environment for a vehicle is depicted in accordance with an illustrative embodiment. Operating environment 500 may be an example of one implementation of operating environment 100 in FIG. 1.

Operating environment 500 includes object 501, vehicle 504, support system 508, and controller 512. Object 501 may be an example of object 104 in FIG. 1. Vehicle 504 may be an example of one implementation of vehicle 102 in FIG. 1. In this illustrative example, vehicle 504 moves on surface 514 of object 501. Support system 508 may be an example of one implementation of support system 146 in FIG. 1. Controller 512 may be an example of one implementation of controller 150 in FIG. 1.

Sensor system 506 is associated with vehicle 504 in a manner that allows sensor system 506 to perform tests on object 501. Sensor system 506 on vehicle 504 may be an example of one implementation of tool 111 on vehicle 102 in FIG. 1. In this illustrative example, sensor system 506 is located on a bottom side of vehicle 504. Sensor system 506 may be located on some other side of vehicle 504 in other implementations.

In this illustrative example, line system 520 in support system 508 is connected to vehicle 504. Line system 520 also is connected to rod 522 and reel 524 in support system 508. Rod 522 is a flexible rod in these illustrative examples and is connected to base 526 of support system 508.

Reel 524 is mounted on base 526 in these illustrative examples. Reel 524 may be a tensionable reel in these examples. Reel 524 may operate to change the tension in line system 520. In these illustrative examples, line system 520 may include a tether, a fluid line, a power line, a data line, other lines, or various combinations of suitable types of lines.

Reel 524 may be controlled by controller 512 to selectively manage the movement of vehicle 504. Lines in line system 520 may be reeled in or let out depending on the desired movement for vehicle 504. When reel 524 is a tensionable reel, controller 512 may not control reel 524.

In these illustrative examples, controller 512 is connected to support system 508. Controller 512 is connected to support system 508 by cable 528. Cable 528 may be an electrical cable capable of carrying information, such as data and commands.

Controller 512 may generate control signals for vehicle 504 to direct movement of vehicle 504 on surface 514 of object 501. Controller 512 also may generate control signals to operate sensor system 506 on vehicle 504. Controller 512 also may generate control signals to operate a magnetic attachment unit comprising an electro-permanent magnet on vehicle 504. Controller 512 also may generate control signals to operate a suction device on vehicle 504. In these illustrative examples, controller 512 communicates with vehicle 504, sensor system 506, and various other components on vehicle 504, through line system 520.

Figure 6:
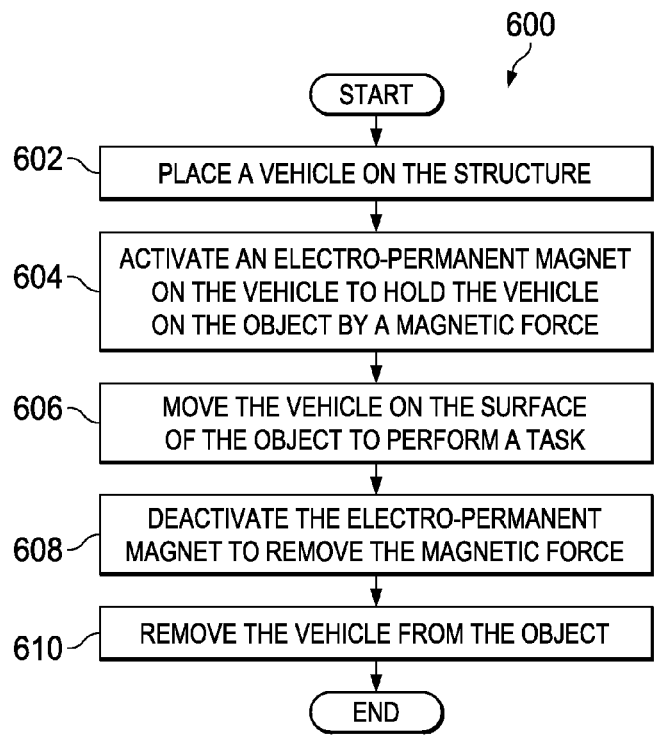
FIG. 6 is an illustration of a flowchart of a process for operating a vehicle on a surface of an object in accordance with an illustrative embodiment.

Turning to FIG. 6, an illustration of a flowchart of a process for operating a vehicle on a surface of an object is depicted in accordance with an illustrative embodiment. Process 600 may be an example of one process for operating vehicle 102 to perform a task on object 104 in operating environment 100 in FIG. 1.

Process 600 may begin with placing a vehicle on the structure (operation 602). An electro-permanent magnet on the vehicle then may be activated to hold the vehicle on the object by a magnetic force (operation 604). The vehicle then may be moved on the surface of the object to perform a task (operation 606).

The electro-permanent magnet may be deactivated to remove the magnetic force (operation 608). The vehicle then may be removed from the object (operation 610), with the process terminating thereafter.

Figure 7:
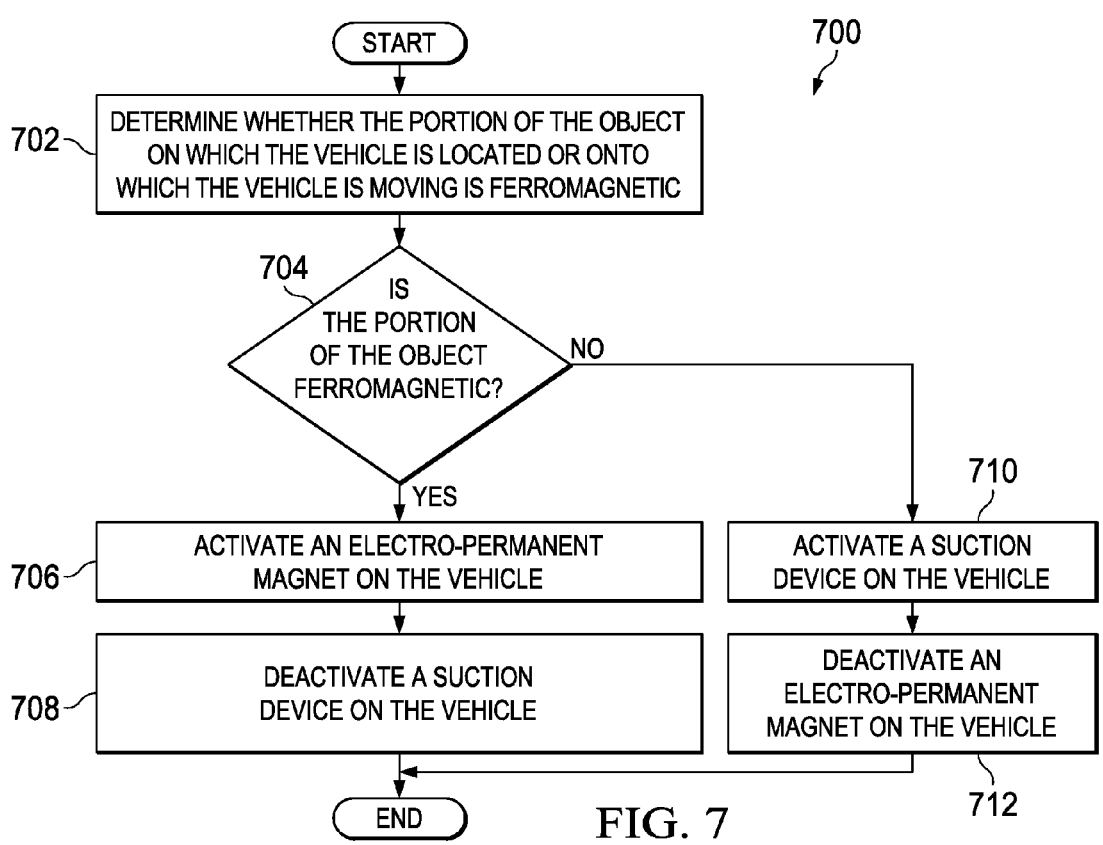
FIG. 7 is an illustration of a flowchart of a process for holding a vehicle on a surface of an object in accordance with an illustrative embodiment.

Turning to FIG. 7, an illustration of a flowchart of a process for holding a vehicle on the surface of an object is depicted in accordance with an illustrative embodiment. Process 700 may be an example of a process for holding vehicle 102 on surface 103 of object 104 comprising portions that are ferromagnetic 106 and portions that are not ferromagnetic 108 in FIG. 1. Process 700 may be repeated as the vehicle is moved on the surface of the object.

Process 700 may begin with determining whether the portion of the object on which the vehicle is located or onto which the vehicle is moving is ferromagnetic (operation 702). When it is determined at operation 704 that the portion of the object is ferromagnetic, an electro-permanent magnet on the vehicle may be activated (operation 706) and a suction device on the vehicle may be deactivated (operation 708), with the process terminating thereafter. When it is determined at operation 704 that the portion of the object is not ferromagnetic, a suction device on the vehicle may be activated (operation 710) and an electro-permanent magnet on the vehicle may be deactivated (operation 712), with the process terminating thereafter.

Figure 8:
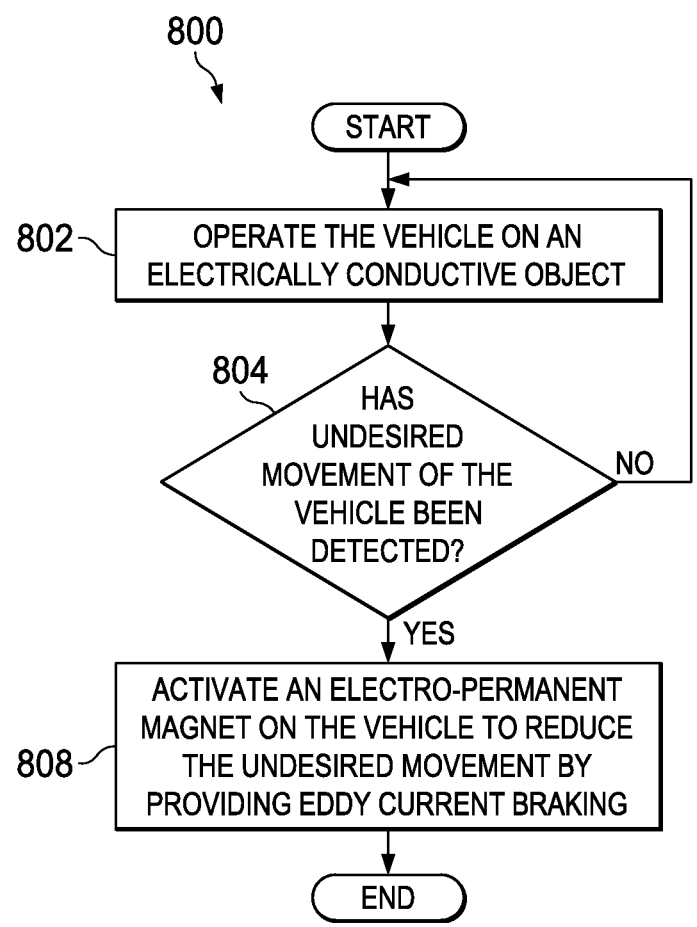
FIG. 8 is an illustration of a flowchart of a process for reducing undesired movement of a vehicle on a surface of an object in accordance with an illustrative embodiment.

Turning to FIG. 8, an illustration of a flowchart of a process for reducing undesired movement of a vehicle on the surface of an object is depicted in accordance with an illustrative embodiment. Process 800 may be used when vehicle 102 is operated on object 104 that is electrically conductive 110 in FIG. 1.

The vehicle may be operated on an electrically conductive object (operation 802). It may be determined whether undesired movement of the vehicle is detected (operation 804). For example, undesired movement may be detected when the vehicle starts to slip or fall from the object. For example, the undesired movement may be detected by a human operator or automatically using appropriate sensor data to detect the undesired movement. When undesired movement of the vehicle is detected, an electro-permanent magnet on the vehicle may be activated to reduce the undesired movement by providing eddy current braking (operation 806), with the process terminating thereafter.

Figure 9:
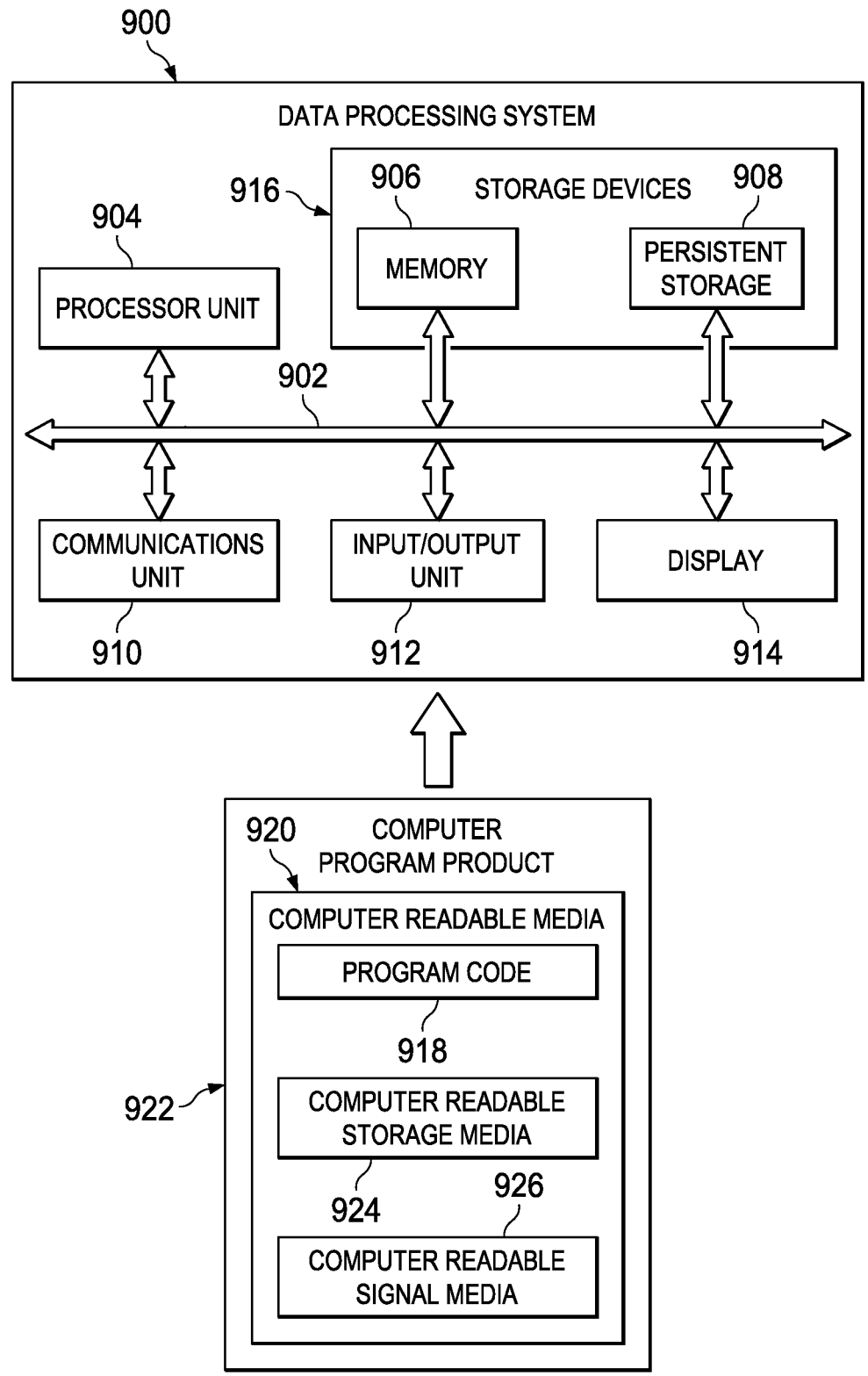
FIG. 9 is an illustration of a block diagram of a data processing system in accordance with an illustrative embodiment.

Turning now to FIG. 9, an illustration of a block diagram of a data processing system is depicted in accordance with an illustrative embodiment. Data processing system 900 may be an example of one implementation of a system on which controller 150 in FIG. 1 may be implemented. In this illustrative example, data processing system 900 includes communications framework 902, which provides communications between processor unit 904, memory 906, persistent storage 908, communications unit 910, input/output (I/O) unit 912, and display 914.

Processor unit 904 serves to execute instructions for software that may be loaded into memory 906. Processor unit 904 may be a number of processors, a multi-processor core, or some other type of processor, depending on the particular implementation. Further, processor unit 904 may be implemented using a number of heterogeneous processor systems in which a main processor is present with secondary processors on a single chip. As another illustrative example, processor unit 904 may be a symmetric multi-processor system containing multiple processors of the same type.

Memory 906 and persistent storage 908 are examples of storage devices 916. A storage device is any piece of hardware that is capable of storing information, such as, for example, without limitation, data, program code in functional form, and/or other suitable information either on a temporary basis and/or a permanent basis. Storage devices 916 also may be referred to as computer readable storage devices in these examples. Memory 906, in these examples, may be, for example, a random access memory or any other suitable volatile or non-volatile storage device. Persistent storage 908 may take various forms, depending on the particular implementation.

For example, persistent storage 908 may contain one or more components or devices. For example, persistent storage 908 may be a hard drive, a flash memory, a rewritable optical disk, a rewritable magnetic tape, or some combination of the above. The media used by persistent storage 908 also may be removable. For example, a removable hard drive may be used for persistent storage 908.

Communications unit 910, in these examples, provides for communications with other data processing systems or devices. In these examples, communications unit 910 is a network interface card. Communications unit 910 may provide communications through the use of either or both physical and wireless communications links.

Input/output unit 912 allows for input and output of data with other devices that may be connected to data processing system 900. For example, input/output unit 912 may provide a connection for user input through a keyboard, a mouse, and/or some other suitable input device. Further, input/output unit 912 may send output to a printer. Display 914 provides a mechanism to display information to a user.

Instructions for the operating system, applications, and/or programs may be located in storage devices 916, which are in communication with processor unit 904 through communications framework 902. In these illustrative examples, the instructions are in a functional form on persistent storage 908. These instructions may be loaded into memory 906 for execution by processor unit 904. The processes of the different embodiments may be performed by processor unit 904 using computer implemented instructions, which may be located in a memory, such as memory 906.

These instructions are referred to as program code, computer usable program code, or computer readable program code that may be read and executed by a processor in processor unit 904. The program code in the different embodiments may be embodied on different physical or computer readable storage media, such as memory 906 or persistent storage 908.

Program code 918 is located in a functional form on computer readable media 920 that is selectively removable and may be loaded onto or transferred to data processing system 900 for execution by processor unit 904. Program code 918 and computer readable media 920 form computer program product 922 in these examples. In one example, computer readable media 920 may be computer readable storage media 924 or computer readable signal media 926.

Computer readable storage media 924 may include, for example, an optical or magnetic disk that is inserted or placed into a drive or other device that is part of persistent storage 908 for transfer onto a storage device, such as a hard drive, that is part of persistent storage 908.

Computer readable storage media 924 also may take the form of a persistent storage, such as a hard drive, a thumb drive, or a flash memory, that is connected to data processing system 900. In some instances, computer readable storage media 924 may not be removable from data processing system 900. In these examples, computer readable storage media 924 is a physical or tangible storage device used to store program code 918 rather than a medium that propagates or transmits program code 918. Computer readable storage media 924 is also referred to as a computer readable tangible storage device or a computer readable physical storage device. In other words, computer readable storage media 924 is a media that can be touched by a person.

Alternatively, program code 918 may be transferred to data processing system 900 using computer readable signal media 926. Computer readable signal media 926 may be, for example, a propagated data signal containing program code 918. For example, computer readable signal media 926 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 918 may be downloaded over a network to persistent storage 908 from another device or data processing system through computer readable signal media 926 for use within data processing system 900. For instance, program code stored in a computer readable storage medium in a server data processing system may be downloaded over a network from the server to data processing system 900. The data processing system providing program code 918 may be a server computer, a client computer, or some other device capable of storing and transmitting program code 918.

The different components illustrated for data processing system 900 are not meant to provide architectural limitations to the manner in which different embodiments may be implemented. The different illustrative embodiments may be implemented in a data processing system including components in addition to or in place of those illustrated for data processing system 900.

Other components shown in FIG. 9 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 904 may take the form of a hardware unit that has circuits that are manufactured or configured for a particular use. This type of hardware may perform operations without needing program code to be loaded into a memory from a storage device to be configured to perform the operations.

For example, when processor unit 904 takes the form of a hardware unit, processor unit 904 may be a circuit system, an application-specific integrated circuit (ASIC), a programmable logic device, or some other suitable type of hardware configured to perform a number of operations. With a programmable logic device, the device is configured to perform the number of operations.

The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 918 may be omitted because the processes for the different embodiments are implemented in a hardware unit.

In still another illustrative example, processor unit 904 may be implemented using a combination of processors found in computers and hardware units. Processor unit 904 may have a number of hardware units and a number of processors that are configured to run program code 918. With this depicted example, some of the processes may be implemented in the number of hardware units, while other processes may be implemented in the number of processors.

In another example, a bus system may be used to implement communications framework 902 and may be comprised of one or more buses, such as a system bus or an input/output bus. Of course, the bus system may be implemented using any suitable type of architecture that provides for a transfer of data between different components or devices attached to the bus system.

Additionally, a communications unit may include a number of more devices that transmit data, receive data, or transmit and receive data. A communications unit may be, for example, a modem or a network adapter, two network adapters, or some combination thereof. Further, a memory may be, for example, memory 906, or a cache, such as found in an interface and memory controller hub that may be present in communications framework 902.

The flowcharts and block diagrams in the different depicted embodiments illustrate the architecture, functionality, and operation of some possible implementations of apparatus and methods in an illustrative embodiment. In this regard, each block in the flowcharts or block diagrams may represent a module, segment, function, and/or a portion of an operation or step. For example, one or more of the blocks may be implemented as program code, in hardware, or a combination of the program code and hardware. When implemented in hardware, the hardware may, for example, take the form of integrated circuits that are manufactured or configured to perform one or more operations in the flowcharts or block diagrams.

In some alternative implementations of an illustrative embodiment, the function or functions noted in the block may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Further, different illustrative embodiments may provide different advantages as compared to other illustrative embodiments. The embodiment or embodiments selected are chosen and described in order to best explain the principles of the disclosure, the practical application, and to enable others of ordinary skill in the art to understand the disclosure for various embodiments with various modifications as are suited to the particular use contemplated.

What is claimed is:

1. An apparatus comprising:
   a frame;
   a capacitor on the frame;
   a number of moveable surface-engaging components attached to the frame;
   a number of actuators operable to move the frame with respect to an object when the number of moveable surface-engaging components is in contact with a surface of the object;
   an electro-permanent magnet operable to hold the number of moveable surface-engaging components in contact with the surface of the object by a magnetic force between the electro-permanent magnet and the object when the electro-permanent magnet is activated to generate the magnetic force and to remove the magnetic force when the electro-permanent magnet is deactivated to release the number of moveable surface-engaging components from the surface of the object; and
   a switching device connected to the electro-permanent magnet and configured to provide electrical power to the electro-permanent magnet, wherein application of the electrical power causes the electro-permanent magnet to selectively change a state of the electro-permanent magnet from activated to deactivated, and wherein the switching device is connected between the capacitor and the electro-permanent magnet and operable to provide the electrical power from the capacitor to the electro-permanent magnet selectively to change the state of the electro-permanent magnet.

2. The apparatus of claim 1, wherein the number of moveable surface-engaging components and the number of actuators are operable to provide holonomic movement of the frame with respect to the surface of the object when the number of moveable surface-engaging components is in contact with the surface of the object.

3. The apparatus of claim 1, wherein the electro-permanent magnet is mounted on the frame.

4. The apparatus of claim 1, wherein the electro-permanent magnet is operable to be activated in response to a first signal and remains activated after the first signal stops and is operable to be deactivated in response to a second signal and remains deactivated after the second signal stops.

5. The apparatus of claim 1 further comprising: a tool on the frame.

6. The apparatus of claim 1 further comprising:
   a support system operable to move the frame with respect to the object, the support system comprising an elongate member and a line system comprising a tether attached to the frame and connecting the frame to the elongate member.

7. An apparatus comprising:
   a frame;
   a capacitor on the frame;
   a number of moveable surface-engaging components attached to the frame;
   a number of actuators operable to move the frame with respect to an object when the number of moveable surface-engaging components is in contact with a surface of the object;
   an electro-permanent magnet operable to hold the number of moveable surface-engaging components in contact with the surface of the object by a magnetic force between the electro-permanent magnet and the object when the electro-permanent magnet is activated to generate the magnetic force and the apparatus is on a portion of the object that is ferromagnetic;
   a switching device connected to the electro-permanent magnet and configured to provide electrical power to the electro-permanent magnet, wherein application of the electrical power causes the electro-permanent magnet to selectively change a state of the electro-permanent magnet from activated to deactivated and wherein the switching device is connected between the capacitor and the electro-permanent magnet and operable to provide the electrical power from the capacitor to the electro-permanent magnet selectively to change the state of the electro-permanent magnet; and
   a suction device operable to provide a suction force to hold the number of moveable surface-engaging components in contact with the surface of the object when the suction device is activated.

8. The apparatus of claim 7 further comprising:
   a controller configured to deactivate the suction device to remove the suction force when the apparatus is on the portion of the object that is ferromagnetic.

9. The apparatus of claim 7 further comprising:
   a controller configured to activate the electro-permanent magnet in response to an undesired movement of the apparatus to reduce the undesired movement of the apparatus by providing eddy current braking when the apparatus is on a portion of the object that is electrically conductive.

10. A method for operating a vehicle on a surface of an object comprising:
    placing the vehicle on the surface of the object, wherein the vehicle comprises a frame, a capacitor on the frame, a number of moveable surface-engaging components attached to the frame, a number of actuators, and an electro-permanent magnet;
    activating the electro-permanent magnet to generate a magnetic force to hold the number of moveable surface-engaging components in contact with the surface of the object by the magnetic force between the electro-permanent magnet and a portion of the object that is ferromagnetic, wherein activating the electro-permanent magnet comprises actuating a switching device to direct electrical power to the electro-permanent magnet and wherein activating the electro-permanent magnet comprises actuating the switching device on the frame to direct the electrical power from the capacitor on the frame to the electro-permanent magnet;
    operating the number of actuators to move the frame with respect to the object when the number of moveable surface-engaging components is held in contact with the surface of the object; and
    deactivating the electro-permanent to remove the magnetic force by actuating the switching device to provide the electrical power to the electro-permanent magnet, wherein the electrical power causes the electro-permanent magnet to selectively change a state of the electro-permanent magnet from activated to deactivated.

11. The method of claim 10, wherein the number of moveable surface-engaging components and the number of actuators are operable to provide holonomic movement of the frame with respect to the surface of the object.

12. The method of claim 10 further comprising: removing the vehicle from the surface of the object when the magnetic force is removed.

13. The method of claim 10, wherein activating the electro-permanent magnet comprises providing a first signal to activate the electro-permanent magnet wherein the electro-permanent magnet is activated in response to the first signal and remains activated after the first signal stops.

14. The method of claim 10, wherein the electrical power provided from the capacitor to the electro-permanent magnet comprises a relatively high current and further comprising charging the capacitor using a relatively lower current provided to the vehicle from a power source that is not on the vehicle.

15. The method of claim 10 further comprising:
activating a suction device on the frame to provide a suction force to hold the number of moveable surface-engaging components in contact with the surface of the object when the vehicle is on a portion of the object that is not ferromagnetic; and
deactivating the suction device to stop providing the suction force when the vehicle is on the portion of the object that is ferromagnetic.

16. The method of claim 15 further comprising:
deactivating the electro-permanent magnet to remove the magnetic force when the vehicle is on the portion of the object that is not ferromagnetic.

17. A method for operating a vehicle on a surface of an object comprising:
holding the vehicle on the surface of the object, wherein the vehicle comprises a frame, a capacitor on the frame, a number of moveable surface-engaging components attached to the frame and held in contact with the surface of the object, a number of actuators, and an electro-permanent magnet;
operating the number of actuators to move the frame with respect to the object when the number of moveable surface-engaging components are held in contact with the surface of the object; and
activating the electro-permanent magnet to reduce undesired movement of the vehicle by providing eddy current braking when the vehicle is on a portion of the object that is electrically conductive, wherein activating the electro-permanent magnet comprises actuating the switching device on the frame to direct the electrical power from the capacitor on the frame to the electro-permanent magnet;
deactivating the electro-permanent magnet to remove the magnetic force by actuating the switching device to provide the electrical power to the electro-permanent magnet, wherein application of the electrical power causes the electro-permanent magnet to selectively change a state of the electro-permanent magnet from activated to deactivated.

18. The method of claim 17 further comprising:
detecting the undesired movement of the vehicle and activating the electro-permanent magnet in response to detecting the undesired movement of the vehicle.

\* \* \* \* \*